United States Patent
Yoshimura et al.

(10) Patent No.: US 7,510,806 B2
(45) Date of Patent: Mar. 31, 2009

(54) LITHIUM SECONDARY BATTERY INCLUDING A LITHIUM BIS(TRIFLUOROMETHYLSULFONYL)IMIDE ELECTROLYTE AND A GLASS FIBER SEPARATOR

(75) Inventors: Seiji Yoshimura, Kobe (JP); Naoki Imachi, Kobe (JP); Keiji Saishou, Kobe (JP); Masanobu Takeuchi, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 484 days.

(21) Appl. No.: 10/841,823

(22) Filed: May 10, 2004

(65) Prior Publication Data

US 2004/0234863 A1 Nov. 25, 2004

(30) Foreign Application Priority Data

May 9, 2003 (JP) .............................. 2003-131948

(51) Int. Cl.
*H01M 2/16* (2006.01)
*H01M 4/58* (2006.01)
*H01M 6/04* (2006.01)

(52) U.S. Cl. .................... 429/247; 429/231.95; 429/341
(58) Field of Classification Search ................ 429/47, 429/247, 341, 231.95

See application file for complete search history.

(56) References Cited

U.S. PATENT DOCUMENTS

| | | | |
|---|---|---|---|
| 4,874,680 A | 10/1989 | Koshiba et al. | 429/197 |
| 4,996,129 A | 2/1991 | Tuck | 429/194 |
| 5,077,152 A | 12/1991 | Yoshino et al. | 429/209 |
| 5,100,437 A * | 3/1992 | Yoshino et al. | 148/535 |
| 5,932,375 A | 8/1999 | Tarcy et al. | 429/231.95 |
| 6,280,881 B1 * | 8/2001 | Wendsjo et al. | 429/301 |
| 6,468,690 B1 * | 10/2002 | Barker et al. | 429/162 |
| 6,482,548 B2 * | 11/2002 | Amatucci | 429/319 |
| 2001/0028980 A1 * | 10/2001 | Yoshimura et al. | 429/231.95 |
| 2003/0162100 A1 * | 8/2003 | Takahashi et al. | 429/333 |

FOREIGN PATENT DOCUMENTS

| | | |
|---|---|---|
| JP | HEI 8-306365 A | 11/1996 |
| JP | HEI 10-510239 A | 10/1998 |
| JP | 2000-173627 A | 6/2000 |
| JP | 2001-148242 A | 5/2001 |
| JP | 2002-63942 A | 2/2002 |
| JP | 2002-298911 A | 10/2002 |

* cited by examiner

*Primary Examiner*—Mark Ruthkosky
*Assistant Examiner*—Karie O'Neill
(74) *Attorney, Agent, or Firm*—Kubovcik & Kubovcik

(57) ABSTRACT

A lithium secondary battery including a positive electrode, a negative electrode, a separator, and a nonaqueous electrolyte including a solute and a solvent, wherein the separator is made of glass fibers and the negative electrode includes a lithium-aluminum-manganese alloy as an active material.

4 Claims, 1 Drawing Sheet

LITHIUM SECONDARY BATTERY INCLUDING A LITHIUM BIS(TRIFLUOROMETHYLSULFONYL)IMIDE ELECTROLYTE AND A GLASS FIBER SEPARATOR

FIELD OF THE INVENTION

The present invention relates to a lithium secondary battery and especially relates to a lithium secondary battery suitable as a battery which is soldered on a printed board by reflow soldering.

BACKGROUND OF THE INVENTION

A secondary battery for memory back-up is soldered by so-called reflow soldering in which a soldering cream is applied to a portion of a printed board where the battery should be placed, the battery is placed on the soldering cream, and the printed board is passed through a reflow furnace at a temperature of 200~270° C. to solder the battery to the board.

Such battery (hereinafter sometimes referred to as a reflow battery) comprises heat-resistant electrodes, electrolyte, separator and the like because it is necessary for the reflow battery to be heat-resistant to the reflow temperature during reflow soldering (JP Laid-open Publication No. 2001-148242).

Although electronic equipment has been highly efficient and highly reliable, sufficient storage characteristics have not been obtained for a reflow battery used for memory back-up.

In the lithium secondary battery, a negative electrode and an electrolyte react during storage because the active material of the negative electrode contains active lithium. Many different electrolytes have been investigated for the lithium secondary battery. However, a desirable electrolyte has not been developed.

OBJECT OF THE INVENTION

An object of the present invention is to provide a lithium secondary battery capable of being used as a reflow battery and having excellent storage characteristics.

SUMMARY OF THE INVENTION

The present invention is a lithium secondary battery comprising a positive electrode, a negative electrode, a separator, and a nonaqueous electrolyte comprising a solute and a solvent, wherein the separator comprises glass fibers and the negative electrode comprises a lithium-aluminum-manganese alloy.

[Explanation of elements]

Figure 1:
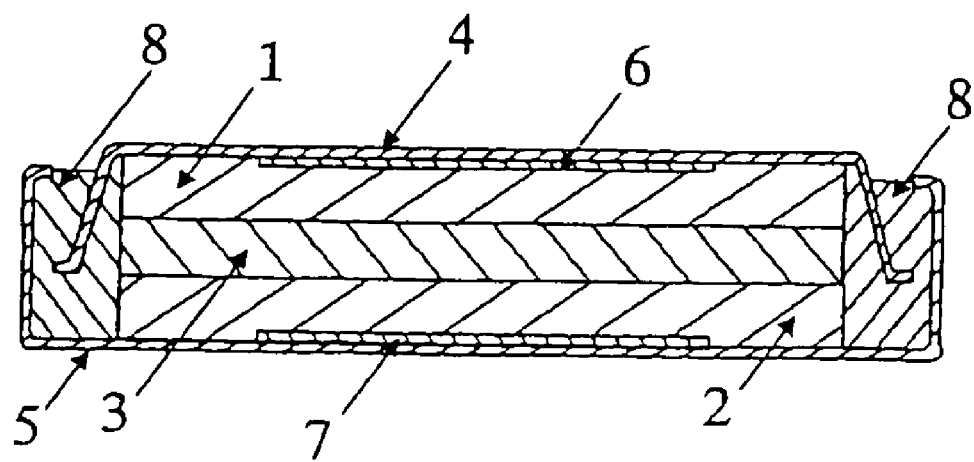
FIG. 1 is a cross section of a battery as prepared in the Examples.

1: negative electrode
2: positive electrode
3: separator
4: negative electrode can
5: positive electrode can
6: negative electrode current collector
7: positive electrode current collector
8: insulation packing

DETAILED EXPLANATION OF THE INVENTION

When the separator made of glass fibers and the negative electrode containing the lithium-aluminum-manganese alloy as an active material are used for a lithium secondary battery, storage characteristics of the battery are improved. It is believed that silicon which is a component of the glass fibers alloys with manganese, which is a component of the negative electrode, to form an ion conductive manganese-silicon film on the negative electrode and the film inhibits reaction between the negative electrode and the electrolyte during storage.

As stated above, in the present invention the separator of a lithium secondary battery is made of glass fibers. A nonwoven fabric of glass fibers is preferred. As the glass fibers, glass fibers comprising boro-silicate glass, soda glass, quartz glass and silicate glass are illustrated. Glass fibers comprising boro-silicate glass and quartz glass are especially preferred.

The lithium-aluminum-manganese alloy used for the negative electrode can be obtained by, for example, electrochemical insertion of lithium into an aluminum-manganese alloy. The manganese content in the aluminum-manganese alloy is preferably in a range of 0.1~10 weight %. If the content is not in this range, storage characteristics will not be sufficiently improved.

There is no limitation with respect to an amount of lithium incorporated into the aluminum-manganese alloy. However, it is preferred to incorporate lithium in a range of 1~500 mAh/g.

As the solute dissolved in the nonaqueous electrolyte a conventional solute can be used. Lithium perfluoroalkylsulfonyl imide is especially preferred. Concretely, lithium bis (trifluoromethylsulfonyl)imide, lithium bis (pentafluoroethylsulfonyl)imide, lithium (trifluoromethylsulfonyl) (pentafluoroethylsulfonyl)imide, lithium bis(heptafluoropropylsulfonyl)imide, lithium (trifluoromethylsulfonyl) (heptafluoropropylsulfonyl)imide and lithium (pentafluoroethylsulfonyl) (heptafluoropropylsulfonyl)imide, and the like can be illustrated.

When lithium perfluoroalkylsulfonyl imide is used as the solute, a manganese-silicon alloy film containing the solute component and having a high ionic conductivity is formed on the surface of the negative electrode to provide a battery having excellent storage characteristics.

There are no limitations with respect to the solvent to be used for the nonaqueous electrolyte if the solvent is useful for a lithium secondary battery. Polyethylene glycol dialkyl ether is preferably used. As an example of the "polyethylene glycol" portion of the polyethylene glycol dialkyl ether, diethylene glycol, triethylene glycol, and tetraethylene glycol can be illustrated. As an example of the "dialkyl" portion of polyethylene glycol dialkyl ether, dimethyl, diethyl, and the like can be illustrated.

When a polyethylene glycol dialkyl ether is used as the solvent, a manganese-silicon alloy film containing the solvent component and having a high ionic conductivity is formed on the surface of the negative electrode to provide a battery having excellent storage characteristics.

The lithium secondary battery of the present invention is especially suitable as a reflow battery mounted by reflow soldering and used for the purpose of memory back-up. A discharge capacity of the reflow battery is in a range of 0.1~50 mAh.

DESCRIPTION OF PREFERRED EMBODIMENT

Embodiments of the present invention are explained in detail below. It is of course understood that the present invention is not limited to the batteries described in the following examples, but can be modified within the scope and spirit of the appended claims.

Experiment 1

EXAMPLE 1-1

[Preparation of Positive Electrode]

Lithium manganese oxide ($LiMn_2O_4$) powder having a spinel structure, carbon black powder as a conductive agent and a fluororesin powder as a binding agent were mixed in a ratio by weight of 85:10:5 to prepare a positive electrode mixture. The positive electrode mixture was fabricated into a disc by foundry molding, and was dried at 250° C. for 2 hours under vacuum to prepare a positive electrode.

[Preparation of Negative Electrode]

Lithium film in an amount which provided a lithium concentration of 15 mol% relative to aluminum was put on an aluminum-manganese alloy plate (the manganese content based on the total weight of aluminum and manganese is 1 weight %), and the plate was dipped in a nonaqueous electrolyte prepared below to occlude lithium electrochemically in the aluminum-manganese alloy and to prepare a lithium-aluminum-manganese alloy (Li—Al—Mn). The lithium-aluminum-manganese alloy was punched out into a disc to prepare a negative electrode.

[Preparation of Nonaqueous Electrolyte]

Lithium bis(trifluoromethylsulfonyl)imide ($LiN(CF_3SO_2)_2$) as a solute was dissolved in, as a nonaqueous solvent, diethylene glycol dimethyl ether (Di-DME) to a concentration of 1 mol/l to prepare a nonaqueous electrolyte.

[Assembling of Battery]

A flat (coin-shaped) lithium secondary battery A1 of the present invention having an outer diameter of 24 mm and a thickness of 3 mm was assembled using the above-prepared positive and negative electrodes and the nonaqueous electrolyte. A non-woven fabric of boro-silicate glass fibers was used as a separator. The separator was impregnated with the nonaqueous electrolyte.

The battery A1 comprised the negative electrode 1, positive electrode 2, the separator 3 placed between the positive electrode 2 and negative electrode 1, a negative electrode can 4, a positive electrode can 5, a negative electrode current collector 6 comprising stainless steel (SUS304), a positive electrode current collector 7 comprising stainless steel (SUS316) and an insulation packing 8 comprising polyphenylsulfide.

The separator 3 was placed between the negative electrode 1 and positive electrode 2 and was placed in a battery case comprising positive electrode can 5 and negative electrode can 4. The positive electrode 2 was connected to the positive electrode can 5 through the positive electrode current collector 7. The negative electrode 1 was connected to the negative electrode can 4 through the negative electrode current collector 6. Chemical energy generated in the battery can be taken outside as electrical energy through terminals of the positive can 5 and the negative can 4.

EXAMPLE 1-2

A battery A2 of the present invention was prepared in the same manner as Example 1-1 except that a non-woven fabric of quartz glass was used as a separator.

EXAMPLE 1-3

A battery A3 of the present invention was prepared in the same manner as Example 1-1 except that a non-woven fabric of soda glass was used as a separator.

COMPARATIVE EXAMPLE 1-1

A comparative battery X1 was prepared in the same manner as Example 1-1 except that a non-woven fabric of polypropylene fibers was used as a separator.

COMPARATIVE EXAMPLE 1-2

A comparative battery X2 was prepared in the same manner as Example 1-1 except that a non-woven fabric of polyethylene fibers was used as a separator.

COMPARATIVE EXAMPLE 1-3

A comparative battery X3 was prepared in the same manner as Example 1-1 except that a non-woven fabric of polyphenylsulfide fabric was used as a separator.

COMPARATIVE EXAMPLE 1-4

A comparative battery X4 was prepared in the same manner as Example 1-1 except that aluminum was used instead of the aluminum-manganese alloy and a material in which lithium was electrochemically inserted into the aluminum was used as a negative electrode material.

COMPARATIVE EXAMPLE 1-5

A comparative battery X5 was prepared in the same manner as Example 1-1 except that an aluminum-chrome alloy in which the chrome content based on the total weight of aluminum and chrome was 1 weight % was used instead of the aluminum-manganese alloy and a material in which lithium was electrochemically inserted into the alloy was used as a negative electrode material.

COMPARATIVE EXAMPLE 1-6

A comparative battery X6 was prepared in the same manner as Example 1-1 except that lithium metal was used instead of the aluminum-manganese alloy.

COMPARATIVE EXAMPLE 1-7

A comparative battery X7 was prepared in the same manner as Example 1-1 except that 95 weight parts of natural graphite powder and 5 weight parts of polyvinylidene fluoride powder were mixed to prepare a negative electrode mixture, the mixture was rolled to form a sheet and was punched out into a disc, and the disc was electrochemically occluded with lithium and was used as a negative electrode.

COMPARATIVE EXAMPLE 1-8

A comparative battery X8 was prepared in the same manner as Example 1-1 except that 90 weight parts of tin oxide (SnO) powder, 5 weight parts of carbon black powder and 5 weight parts of polyvinylidene fluoride powder were mixed to prepare a negative electrode mixture, the mixture was rolled to form a sheet and was punched out into a disc, and the disc was electrochemically occluded with lithium and was used as a negative electrode.

COMPARATIVE EXAMPLE 1-9

A comparative battery X9 was prepared in the same manner as Example 1-1 except that 90 weight parts of silicone oxide (SiO) powder, 5 weight parts of carbon black powder and 5 weight parts of polyvinylidene fluoride powder were mixed to prepare a negative electrode mixture, the mixture was rolled to form a sheet and was punched out into a disc, and the disc was electrochemically occluded with lithium and was used as a negative electrode.

[Measurement of Capacity Maintenance Rate (Storage Characteristics)]

Batteries as prepared above were preheated at 200° C. for one minute, were passed for one minute through a reflow furnace in which the highest temperature was 270° C. and the lowest temperature was 200° C. close to the entrance and exit of the furnace, and were discharged to 2 V at a current of 1 mA at 25° C. to measure discharge capacity ($Q_o$).

Batteries as prepared above were preheated at 200° C. for one minute, were passed for one minute through a reflow furnace in which the highest temperature was 270° C. and the lowest temperature was 200° C. close to the entrance and exit of the furnace, were stored at 60° C. for 20 days, and then were discharged to 2 V at a current of 1 mA at 25° C. to measure discharge capacity ($Q_a$). Each battery's capacity maintenance rate (%) was calculated according to the expression below and the results are shown in Table 1.

Capacity Maintenance Rate (%)=($Q_a/Q_o$)×100

TABLE 1

| Battery | Separator | Negative Electrode | Capacity Maintenance Rate (%) |
|---|---|---|---|
| A1 | Boro-silicate glass fibers | Li—Al—Mn Alloy | 85 |
| A2 | Quartz glass fibers | Li—Al—Mn Alloy | 82 |
| A3 | Soda glass fibers | Li—Al—Mn Alloy | 75 |
| X1 | Polypropylene fibers | Li—Al—Mn Alloy | 32 |
| X2 | Polyethylene fibers | Li—Al—Mn Alloy | 22 |
| X3 | Polyphenylene sulfide fibers | Li—Al—Mn Alloy | 46 |
| X4 | Boro-silicate glass fibers | Li—Al Alloy | 44 |
| X5 | Boro-silicate glass fibers | Li—Al—Cr Alloy | 46 |
| X6 | Boro-silicate glass fibers | Lithium Metal | 30 |
| X7 | Boro-silicate glass fibers | Li-natural graphite | 25 |
| X8 | Boro-silicate glass fibers | Li—SnO | 32 |
| X9 | Boro-silicate glass fibers | Li—SiO | 30 |

As shown in Table 1, batteries A1~A3 of the present invention have improved capacity maintenance rates as compared to comparative batteries X1~X9. That is, the batteries of the present invention have excellent storage characteristics. As described above, it is believed that silicon, a component of the glass fibers, forms an alloy with manganese, a component of the negative electrode, and a manganese-silicon alloy film which is ionically conductive is formed on the negative electrode and the film inhibits reaction between the negative electrode and the electrolyte during storage.

When boro-silicate glass and quartz glass are used, the storage characteristics are especially improved.

Experiment 2

EXAMPLE 2-1

A battery B1 of the present invention was prepared in the same manner as Example 1-1 except that an aluminum-manganese alloy having a manganese content of 0.1 weight % was used as the aluminum-manganese alloy.

EXAMPLE 2-2

A battery B2 of the present invention was prepared in the same manner as Example 1-1 except that an aluminum-manganese alloy having a manganese content of 0.5 weight % was used as the aluminum-manganese alloy.

EXAMPLE 2-3

Battery B3 is the same as battery A1. That is, the manganese content in an aluminum-manganese alloy is 1 weight %.

EXAMPLE 2-4

A battery B4 of the present invention was prepared in the same manner as Example 1-1 except that an aluminum-manganese alloy having a manganese content of 5 weight % was used as the aluminum-manganese alloy.

EXAMPLE 2-5

A battery B5 of the present invention was prepared in the same manner as Example 1-1 except that an aluminum-manganese alloy having a manganese content of 10 weight % was used as the aluminum-manganese alloy.

COMPARATIVE EXAMPLE 2-1

A comparative battery Y1 was prepared in the same manner as Example 1-1 except that lithium-aluminum alloy was used instead of the lithium-aluminum-manganese alloy.

[Measurement of Capacity Maintenance Rate (Storage Characteristics)]

Capacity maintenance rate (%) of each of batteries B1~B5 of the present invention and battery Y1 of Comparative Example 2-1 was obtained in the same manner as Experiment 1. The results are shown in Table 2 together with the results for batteries A1 and Y1.

TABLE 2

| Battery | Mn Content in Al—Mn (weight %) | Capacity Maintenance Rate (%) |
|---|---|---|
| Y1 (X4) | 0 | 44 |
| B1 | 0.1 | 69 |
| B2 | 0.5 | 74 |
| B3 (A1) | 1 | 85 |
| B4 | 5 | 77 |
| B5 | 10 | 70 |

As is clear from the results, when the manganese content of the aluminum-manganese alloy is in a range of 0.1~10 weight %, excellent storage characteristics are obtained.

Experiment 3

EXAMPLE 3-1

A battery C1 was prepared in the same manner as Example 1-1 (battery A1).

EXAMPLE 3-2

A battery C2 of the present invention was prepared in the same manner as Example 1-1 except that lithium (trifluoromethylsulfonyl)(pentafluoroethylsulfonyl) imide (LiN(CF$_3$SO$_2$)(C$_2$F$_5$SO$_2$)) was used as the solute in the nonaqueous electrolyte.

EXAMPLE 3-3

A battery C3 of the present invention was prepared in the same manner as Example 1-1 except that lithium bis(pentafluoroethylsulfonyl) imide (LiN(C$_2$F$_5$SO$_2$)$_2$) was used as the solute in the nonaqueous electrolyte.

EXAMPLE 3-4

A battery C4 of the present invention was prepared in the same manner as Example 1-1 except that lithium tris(trifluoromethylsulfonyl) methide (LiC(CF$_3$SO$_2$)$_3$) was used as the solute in the nonaqueous electrolyte.

EXAMPLE 3-5

A battery C5 of the present invention was prepared in the same manner as Example 1-1 except that lithium trifluoromethanesulfonate (LiCF$_3$SO$_3$) was used as the solute in the nonaqueous electrolyte.

EXAMPLE 3-6

A battery C6 of the present invention was prepared in the same manner as Example 1-1 except that lithium hexafluorophosphate (LiPF$_6$) was used as the solute in the nonaqueous electrolyte.

EXAMPLE 3-7

A battery C7 of the present invention was prepared in the same manner as Example 1-1 except that lithium tetrafluoroborate (LiBF$_4$) was used as the solute in the nonaqueous electrolyte.

EXAMPLE 3-8

A battery C8 of the present invention was prepared in the same manner as Example 1-1 except that lithium hexafluoroarsenate (LiAsF$_6$) was used as the solute in the nonaqueous electrolyte.

EXAMPLE 3-9

A battery C9 of the present invention was prepared in the same manner as Example 1-1 except that lithium perchlorate (LiClO$_4$) was used as the solute in the nonaqueous electrolyte.

[Measurement of Capacity Maintenance Rate (Storage Characteristics)]

Capacity maintenance rate (%) of each of batteries C1~C9 was obtained in the same manner as Experiment 1. The results are shown in Table 3.

TABLE 3

| Battery | Solute (1M) | Capacity Maintenance Rate (%) |
|---|---|---|
| C1 (A1) | LiN(CF$_3$SO$_2$)$_2$ | 85 |
| C2 | LiN(CF$_3$SO$_2$)(C$_2$F$_5$SO$_2$) | 83 |
| C3 | LiN(C$_2$F$_5$SO$_2$)$_2$ | 84 |
| C4 | LiC(CF$_3$SO$_2$)$_3$ | 75 |
| C5 | LiCF$_3$SO$_3$ | 68 |
| C6 | LiPF$_6$ | 65 |
| C7 | LiBF$_4$ | 66 |
| C8 | LiAsF$_6$ | 69 |
| C9 | LiClO$_4$ | 55 |

As is clear from the results, batteries C1~C3 of the present invention using lithium perfluoroalkylsulfonyl imide as the solute have high capacity maintenance rates, and have excellent storage characteristics.

Experiment 4

EXAMPLE 4-1

A battery D1 was prepared in the same manner as Example 1-1 (battery A1).

EXAMPLE 4-2

A battery D2 of the present invention was prepared in the same manner as Example 1-1 except that triethylene glycol dimethyl ether (Tri-DME) was used as the nonaqueous solvent.

EXAMPLE 4-3

A battery D3 of the present invention was prepared in the same manner as Example 1-1 except that tetraethylene glycol dimethyl ether (Tetra-DME) was used as the nonaqueous solvent.

EXAMPLE 4-4

A battery D4 of the present invention was prepared in the same manner as Example 1-1 except that diethylene glycol diethyl ether (Di-DEE) was used as the nonaqueous solvent.

EXAMPLE 4-5

A battery D5 of the present invention was prepared in the same manner as Example 1-1 except that triethylene glycol diethyl ether (Tri-DEE) was used as the nonaqueous solvent.

EXAMPLE 4-6

A battery D6 of the present invention was prepared in the same manner as Example 1-1 except that a mixture of diethylene glycol dimethyl ether (Di-DME) and propylene carbonate (PC) in a ratio of 80:20 by volume was used as the nonaqueous solvent.

EXAMPLE 4-7

A battery D7 of the present invention was prepared in the same manner as Example 1-1 except that a mixture of diethylene glycol dimethyl ether (Di-DME) and 1,2-dimethoxyethane (DME) in a ratio of 80:20 by volume was used as the nonaqueous solvent.

EXAMPLE 4-8

A battery D8 of the present invention was prepared in the same manner as Example 1-1 except that propylene carbonate (PC) was used as the nonaqueous solvent.

EXAMPLE 4-9

A battery D9 of the present invention was prepared in the same manner as Example 1-1 except that a mixture of propylene carbonate (PC) and diethyl carbonate (DEC) in a ratio of 80:20 by volume was used as the nonaqueous solvent.

EXAMPLE 4-10

A battery D10 of the present invention was prepared in the same manner as Example 1-1 except that a mixture of propylene carbonate (PC) and 1,2-dimethoxyethane (DME) in a ratio of 80:20 by volume was used as a nonaqueous solvent.

[Measurement of Capacity Maintenance Rate (Storage Characteristics)]

Capacity maintenance rate (%) of each of batteries D1~D10 was obtained in the same manner as Experiment 1. The results are shown in Table 4.

TABLE 4

| Battery | Solvent (ratio by volume) | Solute (1M) | Capacity Maintenance Rate (%) |
|---|---|---|---|
| D1 (A1) | Di-DME | $LiN(CF_3SO_2)_2$ | 85 |
| D2 | Tri-DME | $LiN(CF_3SO_2)_2$ | 83 |
| D3 | Tetra-DME | $LiN(CF_3SO_2)_2$ | 79 |
| D4 | Di-DEE | $LiN(CF_3SO_2)_2$ | 84 |
| D5 | Tri-DEE | $LiN(CF_3SO_2)_2$ | 81 |
| D6 | Di-DME/PC (80:20) | $LiN(CF_3SO_2)_2$ | 88 |
| D7 | Di-DME/DME (80:20) | $LiN(CF_3SO_2)_2$ | 80 |
| D8 | PC | $LiN(CF_3SO_2)_2$ | 66 |
| D9 | PC/DEC (80:20) | $LiN(CF_3SO_2)_2$ | 65 |
| D10 | PC/DME (80:20) | $LiN(CF_3SO_2)_2$ | 63 |

As is clear from the results, batteries D1~D7 including polyethylene glycol dialkyl ether as the solvent have high capacity maintenance rates, and have excellent storage characteristics.

ADVANTAGES OF THE INVENTION

The present invention can provide a lithium secondary battery having excellent storage characteristics. The lithium secondary battery is especially useful as a secondary battery to be subjected to reflow soldering.

What is claimed is:

1. A lithium secondary battery comprising a positive electrode, a negative electrode, a separator and a nonaqueous electrolyte comprising a solute and a solvent, wherein the separator comprises a glass fiber, the positive electrode is a lithium manganese oxide having a spinel structure, the negative electrode comprises a lithium-aluminum-manganese alloy having a manganese content in a range of 0.5~5 weight %, the solute of the electrolyte is lithium bis(trifluoromethylsulfonyl)imide, and the solvent of the electrolyte is a mixture of propylene carbonate and a polyethylene glycol dialkyl ether, wherein the polyethylene glycol is selected from the group consisting of diethylene glycol dimethyl ether, triethylene glycol dimethyl ether, tetraethylene glycol dimethyl ether, diethylene glycol diethyl ether, triethylene glycol diethyl ether.

2. The lithium secondary battery according to claim 1, wherein the glass fiber is a boro-silicate glass or a quartz glass.

3. The lithium secondary battery according to claim 1, wherein the lithium-aluminum-manganese alloy is an alloy manufactured by electrochemical insertion of lithium into an aluminum-manganese alloy.

4. The lithium secondary battery according to claim 2, wherein the lithium-aluminum-manganese alloy is an alloy manufactured by electrochemical insertion of lithium into an aluminum-manganese alloy.

* * * * *